United States Patent [19]

Hawkins

[11] Patent Number: 5,586,642
[45] Date of Patent: Dec. 24, 1996

[54] CONVEYOR SYSTEMS

[75] Inventor: Christopher J. Hawkins, Burnham, United Kingdom

[73] Assignee: BWI KartridgPak Co., Davenport, Iowa

[21] Appl. No.: 557,996

[22] Filed: Nov. 13, 1995

[30] Foreign Application Priority Data

Nov. 26, 1994 [GB] United Kingdom .................... 9423936

[51] Int. Cl.⁶ ................................................. B65G 17/34
[52] U.S. Cl. ................................... 198/803.11; 198/803.1
[58] Field of Search ........................... 198/803.1, 803.11, 198/803.13, 470.1

[56] References Cited

U.S. PATENT DOCUMENTS

| | | | |
|---|---|---|---|
| 1,815,372 | 7/1931 | Frazier | 198/803.1 |
| 2,169,166 | 8/1939 | Rober et al. | 198/803.1 X |
| 2,358,292 | 9/1944 | Malhiot | 198/803.11 |
| 4,718,540 | 1/1988 | Greenwell | 198/803.11 X |
| 4,893,707 | 1/1990 | Langen et al. | 198/803.11 X |
| 5,094,339 | 3/1992 | Thelen et al. | 198/803.1 X |
| 5,238,101 | 8/1993 | Ota et al. | 198/803.11 X |
| 5,328,021 | 7/1994 | Calvert et al. | 198/803.11 |
| 5,337,887 | 8/1994 | Greenwell et al. | 198/803.13 X |

*Primary Examiner*—James R. Bidwell
*Attorney, Agent, or Firm*—Lockwood, Alex, Fitzgibbon & Cummings

[57] ABSTRACT

A conveyor system includes a pair of endless chains each having a plurality of links and each constrained to drive around a common endless loop by a pair of spaced rotary sprocket assemblies. Each link of each chain carries an outwardly directed finger. Pairs of fingers one from each chain are arranged to engage a can to displace it along the forward run of the loop. Changing the spacings between the fingers to accommodate different sizes of cans on different runs is achieved by effecting longitudinal displacement between the chains which in turn is achieved by adjusting the angular spacing between the sprocket wheels on the sprocket assembly. The fingers of each pair open up as they pass around the sprocket assembly and close up on the can to hold the can captive for the length of the forward run.

8 Claims, 2 Drawing Sheets

CONVEYOR SYSTEMS

BACKGROUND OF THE INVENTION

The present invention relates to conveyor systems for conveying cylindrical objects.

DESCRIPTION OF THE PRIOR ART

Cylindrical objects such as aerosol and spray cans are conveyed in spaced relationship through a processing station where various processes such as filling and sealing are applied to the cans.

Conveyor systems for conveying the cans usually comprise rotary carousels onto which the cans are deposited, carried through the processing station and then are discharged. Such rotary carousels are usually designed for one size of can and are generally difficult to adapt if a different size of can is to be processed and if different processing operations are required.

It is an object of the invention to provide an improved conveyor system.

SUMMARY OF THE INVENTION

According to the present there is provided a conveyor system for conveying cylindrical objects along a predetermined path, said system comprising first and second elongate endless members constrained to be driven in synchronism around a predetermined loop by a rotary assembly at each end, each member carrying a plurality of spaced, outwardly-directed fingers, which are arranged to engage said cylindrical objects and displace said cylindrical objects along said predetermined path, adjustment means for effecting relative longitudinal displacement between such endless members to vary the spacing between each finger on one said member relative to a corresponding finger on the other said member in a sense to equal the diameter of the cylindrical object whereby to close the fingers up on said object when inserted between the fingers.

DESCRIPTION OF THE DRAWINGS

An aerosol can conveying system will now be described, by way of example, with reference to the accompanying diagrammatic drawings, in which.

DESCRIPTION OF THE PREFERRED EMBODIMENTS

Figure 1:
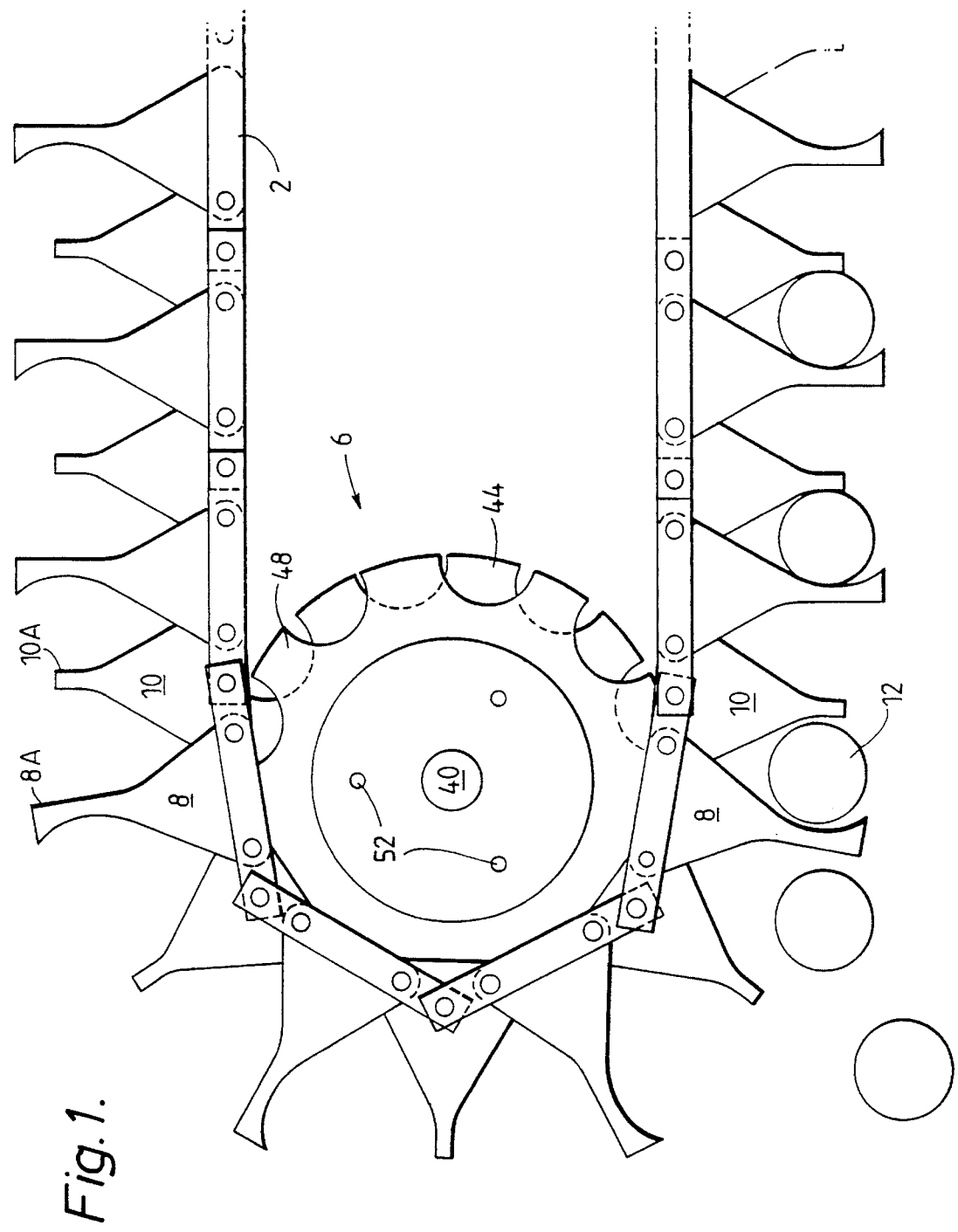
FIG. 1 is a fragmentary plan view of the conveyor system.

The conveyor system comprises a pair of drive chains 2 and 4 which are located one above the other and supported for displacement about an endless loop by a pair of spaced sprocket wheel assemblies 6 (only one shown). The upper chain 2 supports a series of first fingers 8 while the lower chain 4 supports a series of second fingers 10. Each first finger 8 cooperates with a corresponding second finger 10 to hold a respective can 12 captive between them and to drive the can over a smooth surface on which it rests through a processing system (not shown).

Each sprocket wheel assembly 6 drives the two chains in synchronism but is adjustable to effect longitudinal displacement between the chains. This acts to vary the spacing between cooperating pairs of fingers and so allows the system to be adjusted between production runs for cans of different diameter.

Figure 2:
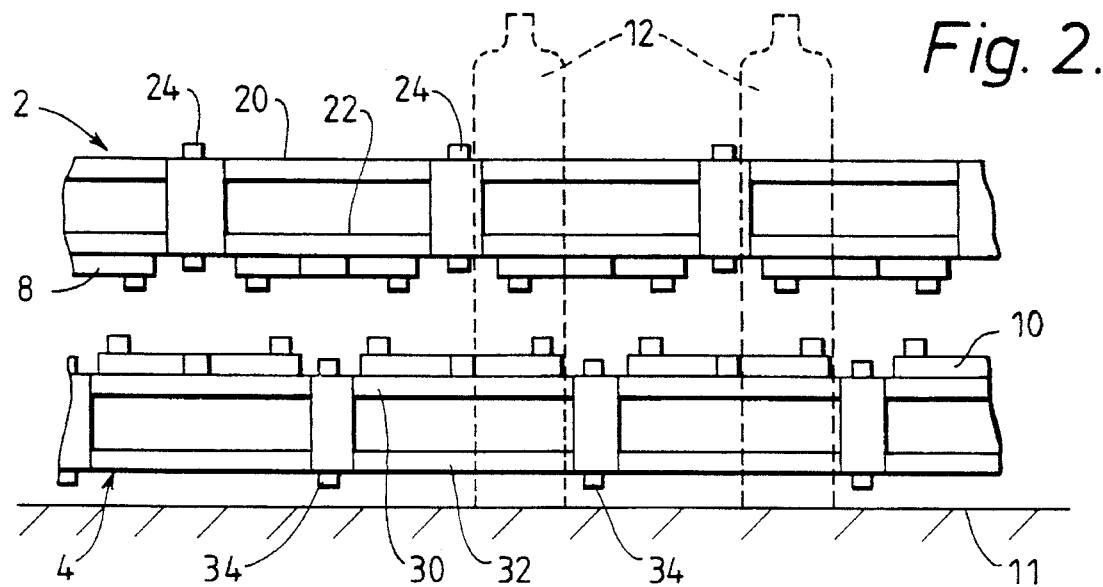
FIG. 2 is a fragmentary elevation of a pair of drive chains of the system.
Figure 3:
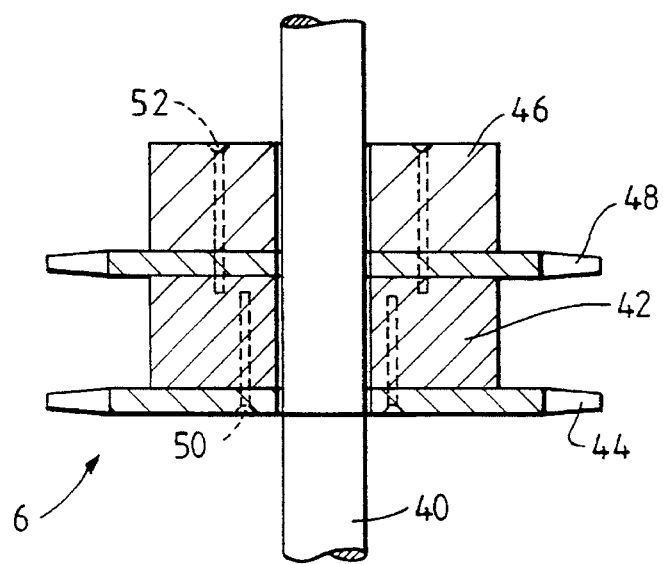
FIG. 3 is a fragmentary elevation of the sprocket wheels for driving the chains of FIG. 2.

The two chains 2 and 4 as shown in FIG. 2 are spaced vertically close together. Each chain is similar to a bicycle chain. Each link of the chain 2 is formed by a pair of parallel spaced planar arms 20 and 22 which are coupled to the arms of adjacent links by pivot pins 24. Similarly, each link of the chain 4 has a pair of parallel spaced planar arms 30 and 32 which are coupled to the arms of adjacent links by pivot pins 34.

Each first finger 8 is secured by a pair of rivets to the underside of the arm 22 of a corresponding link of the upper chain 2. Each second finger 10 is secured by a pair of rivets to the upper surface of the arm 30 of a corresponding link of the lower chain 4. In this way there is only a small vertical separation between the two series of first and second fingers 8 and 10, the separation being less than the vertical distance between the endless chains 2 and 4. This is important in ensuring that the cans are held in vertical altitude while being driven horizontally. A larger separation between the fingers 8 and 10 will make the cans more susceptible to twisting and therefore dislodgement from between the fingers in response to slight disturbances. Instead, the fingers 8 and 10 may, of course, be secured to other components of their respective chains 2 and 4.

The sprocket wheel assembly 6 comprises a rotary shaft 40 which is driven by a pneumatic rotating actuator, or an electric or hydraulic motor (not shown). An annular hub 42 is rigid with the shaft 40. A lower sprocket wheel 44 is secured to the underside of the hub 42 by screws 50. An upper sprocket wheel 48 is clamped against the upper side of the hub 42 by a bush 46 which is secured to the hub 42 by screws 52.

The screws 52 pass through respective arcuate slots in the wheel 48 which slots are concentric with the shaft 40. Thus, when the screws 52 are slackened, the wheel 48 can be angularly displaced relative to the hub 42 and the wheel 44.

The wheels 48 and 44 engage the links of respective ones of the chains 2 and 4. Angularly displacing the wheels 44 and 48 relative to each other effects the angular displacement of one chain relative to the other and therefore the separation between corresponding pairs of fingers 8 and 10. This enables the fingers of each pair to be moved together or apart to accommodate different sizes of cans used on different runs. While the adjustment between the two sprocket wheels 44 and 48 has been effected manually, it will be appreciated that more sophisticated adjusting methods involving clutches and gears can be adopted to automate or semiautomate the process.

The fingers 8 and 10 are differently shaped. Each finger has a triangular shaped base but the finger 10 has a narrow parallel sided projection 10A, while the finger 8 has a longer projection 8A with a lateral arcuate recess on a side thereof which lies adjacent the projection 10A of its paired finger 10.

When the two projections 8A and 10A are spaced apart by the diameter of a selected can, the can, when located between the projections, will be held captive between the projections 8A and 10A. The can will, however, be free to pivot about a generally horizontal axis if knocked but will not escape from between the two fingers. The can may however be lifted vertically from between the two fingers.

In operation, a series of cans 12 are fed at regularly spaced intervals (for example by another sprocket wheel) to the conveyor system at a point located adjacent the upstream sprocket assembly 6. As the fingers 8 and 10 pass around the sprocket assembly 6, their distal ends move apart from one another because of the different angular displacement of the corresponding links of the two chains. The fingers 8 and 10 thus are opened up to receive a respective can 12.

As the fingers 8 and 10 approach the upstream end of the forward run of the conveyor system, they close up again on the can to hold the can captive to drive the can along a base 11. Similarly, at the downstream end of the forward run of the conveyor system the fingers 8 and 10 open up again as the chains pass around the downstream sprocket assembly. This releases the can for discharge from the conveyor system. A conveyor (not shown) at the downstream end carries the cans away for packing and dispatch.

The surface of the base 11 over which the cans 12 are displaced by the conveyor system is preferably smooth low friction surface.

Various processing assemblies (not shown) are provided along the forward run of the conveyor system.

The return run of the conveyor system preferably passes over a cavity into which any can, which inadvertently remains captive between the two fingers, can fall.

In some applications a guard rail (not shown) may be provided adjacent the downstream assembly 6 to hold the cans captive between their corresponding fingers 8 and 10 so that the can will enter the return run of the system. The can may then be processed by other processing units located along the return run.

Although the present invention has been described with reference to preferred embodiments, workers skilled in the art will recognize that changes may be made in form and detail without departing from the spirit and scope of the invention.

I claim:

1. A conveyor system for conveying upright cylindrical objects along a predetermined vertical path, defined by a predetermined vertical loop, said system comprising first and second vertically oriented elongate endless members, first and second vertically oriented rotary assemblies positioned at opposite ends of the loop to constrain the elongate members to be driven in synchronism around said predetermined loop, a plurality of longitudinally and vertically spaced, horizontally and outwardly-directed, vertically thin fingers independently mounted on each member and arranged to independently engage said cylindrical objects at vertically spaced locations on opposite sides and displace said cylindrical objects along said predetermined path, adjustment means for effecting relative longitudinal displacement between such endless members to vary the spacing between each finger on one said member relative to a corresponding finger on the other said member in a sense to equal the diameter of the cylindrical object whereby to close the fingers up on said object when inserted between the fingers.

2. A conveyor,system according to claim 1, wherein each said elongate member comprises a chain having, a plurality of links, with a corresponding one of said fingers supported on each said link.

3. A conveyor system according to claim 2, wherein in said rotary assembly comprises a pair of sprocket wheels arranged to engage respective one of said chains, and a shaft supporting said sprocket wheel.

4. A conveyor system according to claim 3, wherein said adjustment means comprises displacement means for effecting relative angular displacement between the sprocket wheels of each pair, and means for locking the sprocket wheels together in their displaced positions.

5. A conveyor system according to claim 1, including feed means for feeding a succession of cylindrical objects between a succession of pairs of fingers at a position adjacent the rotary assembly which is located at the upstream end of the predetermined path.

6. A conveyor system according to claim 5, wherein at least one finger of each pair defines a recess on a side thereof which is arranged to engage a said object, whereby as the fingers of each pair close up on a said object, following their passage around the upstream rotary assembly, they hold the object captive there between until they open up again on passing around the downstream rotary assembly.

7. A conveyor system according to claim 6, wherein said recess is arcuate.

8. A conveyor system according to claim 1 or to claim 2, wherein the vertical spacing between the fingers of each pair is narrower than the vertical spacing between said endless members.

\* \* \* \* \*